United States Patent
Sharma et al.

(10) Patent No.: US 11,314,147 B1
(45) Date of Patent: Apr. 26, 2022

(54) FOLDED CAMERA WITH ACTUATOR FOR MOVING OPTICS

(71) Applicant: Apple Inc., Cupertino, CA (US)

(72) Inventors: Shashank Sharma, San Francisco, CA (US); Alfred N. Mireault, Cambridge, MA (US)

(73) Assignee: Apple Inc., Cupertino, CA (US)

(*) Notice: Subject to any disclaimer, the term of this patent is extended or adjusted under 35 U.S.C. 154(b) by 217 days.

(21) Appl. No.: 16/417,936

(22) Filed: May 21, 2019

Related U.S. Application Data

(60) Provisional application No. 62/678,928, filed on May 31, 2018.

(51) Int. Cl.
| | | |
|---|---|---|
| *G03B 5/04* | (2021.01) | |
| *G03B 17/17* | (2021.01) | |
| *G03B 13/36* | (2021.01) | |
| *G03B 5/08* | (2021.01) | |

(52) U.S. Cl.
CPC .............. *G03B 5/04* (2013.01); *G03B 5/08* (2013.01); *G03B 13/36* (2013.01); *G03B 17/17* (2013.01); *G03B 2205/0015* (2013.01); *G03B 2205/0023* (2013.01); *G03B 2205/0069* (2013.01)

(58) Field of Classification Search
USPC ........................................................ 359/355
See application file for complete search history.

(56) References Cited

U.S. PATENT DOCUMENTS

| | | | |
|---|---|---|---|
| 2,649,022 | A * | 8/1953 | Angenieux ............ G02B 13/04 359/753 |
| 7,274,518 | B1 | 9/2007 | Tang et al. |
| 7,646,418 | B2 | 1/2010 | Nanjo |
| 8,014,080 | B1 | 9/2011 | Chen et al. |
| 8,837,929 | B2 | 9/2014 | Nomura et al. |
| 9,172,856 | B2 | 10/2015 | Bohn et al. |
| 9,549,107 | B2 | 1/2017 | Georgiev |
| 9,733,458 | B2 | 8/2017 | Georgiev et al. |
| 9,829,684 | B2 | 11/2017 | Shabtay et al. |
| 9,973,680 | B2 | 5/2018 | Osborne |
| 10,070,060 | B2 | 9/2018 | Goldenberg et al. |
| 10,156,706 | B2 | 12/2018 | Shabtay et al. |
| 2004/0141065 | A1 | 7/2004 | Hara et al. |

(Continued)

FOREIGN PATENT DOCUMENTS

| | | |
|---|---|---|
| JP | 2009526257 | 7/2009 |
| TW | 594037 | 4/2004 |

(Continued)

OTHER PUBLICATIONS

U.S. Appl. No. 16/244,030, filed Jan. 9, 2019, Scott W. Miller et al.

(Continued)

*Primary Examiner* — Collin X Beatty
(74) *Attorney, Agent, or Firm* — Robert C. Kowert; Kowert, Hood, Munyon, Rankin & Goetzel, P.C.

(57) ABSTRACT

Various embodiments include a camera with folded optics. Some embodiments include a voice coil motor (VCM) actuator module to provide autofocus (AF) and/or optical image stabilization (OIS) movement. Some embodiments include suspension arrangements. Some embodiments include flexure arrangements.

20 Claims, 13 Drawing Sheets

(56) References Cited

U.S. PATENT DOCUMENTS

| | | | |
|---|---|---|---|
| 2012/0249815 A1* | 10/2012 | Bohn | H04N 5/23232 |
| | | | 348/208.99 |
| 2012/0314307 A1* | 12/2012 | Ikushima | G02B 27/646 |
| | | | 359/814 |
| 2013/0182336 A1 | 7/2013 | Hsu et al. | |
| 2013/0201559 A1 | 8/2013 | Minamisawa et al. | |
| 2015/0373252 A1 | 12/2015 | Georgiev | |
| 2016/0044247 A1 | 2/2016 | Shabtay et al. | |
| 2016/0266400 A1 | 9/2016 | Georgiev | |
| 2016/0353008 A1 | 12/2016 | Osborne | |
| 2017/0187962 A1 | 6/2017 | Lee et al. | |
| 2017/0329102 A1 | 11/2017 | Yuza et al. | |
| 2017/0359568 A1 | 12/2017 | Georgiev et al. | |
| 2018/0017844 A1 | 1/2018 | Yu et al. | |
| 2018/0120674 A1* | 5/2018 | Avivi | G03B 17/04 |
| 2018/0239162 A1 | 8/2018 | Lee et al. | |
| 2019/0094500 A1 | 3/2019 | Tseng et al. | |
| 2019/0212632 A1 | 7/2019 | Miller et al. | |
| 2019/0227406 A1* | 7/2019 | Wang | G02B 27/0068 |
| 2019/0235202 A1 | 8/2019 | Smyth et al. | |
| 2019/0243112 A1 | 8/2019 | Yao et al. | |
| 2020/0057313 A1* | 2/2020 | Lee | G02B 13/0065 |

FOREIGN PATENT DOCUMENTS

| | | |
|---|---|---|
| WO | 2016207754 | 12/2016 |
| WO | 2017037688 | 3/2017 |

OTHER PUBLICATIONS

U.S. Appl. No. 16/258,377, filed Jan. 25, 2019, Nicholas D. Smyth et al.

U.S. Appl. No. 16/264,463, filed Jan. 31, 2019, Yuhong Yao et al.

\* cited by examiner

FOLDED CAMERA WITH ACTUATOR FOR MOVING OPTICS

This application claims benefit of priority to U.S. Provisional Application No. 62/678,928, filed May 31, 2018, titled "Folded Camera with Actuator for Moving Optics", which is hereby incorporated by reference in its entirety.

BACKGROUND

Technical Field

This disclosure relates generally to architecture for a camera with folded optics.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIG. 2A is a perspective view of the camera that illustrates an example actuator arrangement and an example suspension arrangement of the camera. FIG. 2B is a side cross-sectional view of the camera that illustrates the actuator arrangement. FIG. 2C is a perspective cross-sectional view of the camera that illustrates the actuator arrangement. FIG. 2D is a perspective view of the camera that illustrates the actuator arrangement and the suspension arrangement.

FIG. 4A shows an exploded view of the prism module.

FIG. 4B shows a perspective view of the prism module along with other components of the folded optics arrangement of the camera. FIG. 4C shows a perspective view of the prism module that illustrates an aspect of how the flexure arrangement is coupled with a prism carrier and a prism base structure. FIG. 4D shows a perspective view of the prism module that illustrates an aspect of how the flexure arrangement is coupled with the prism carrier.

Figure 1:
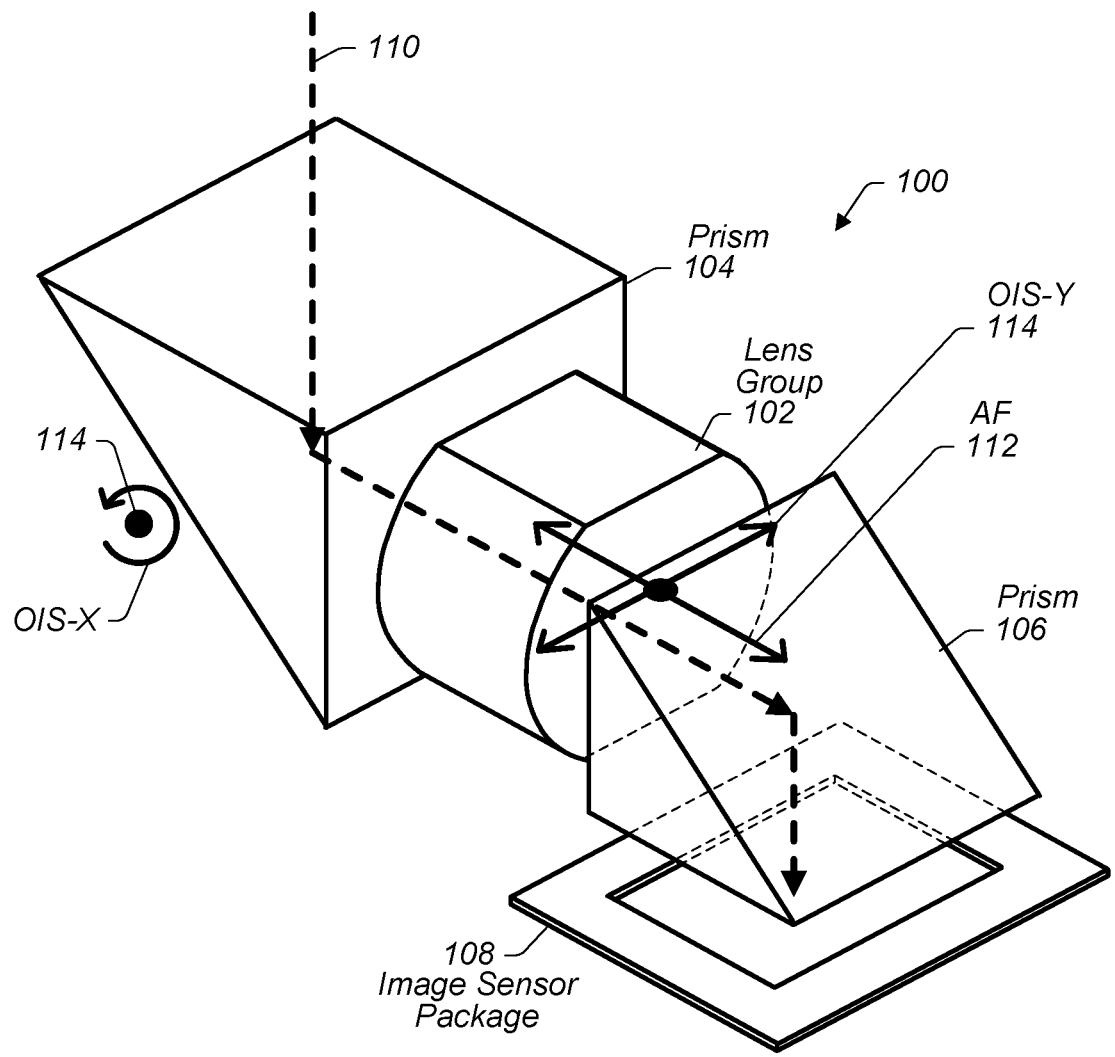
FIG. 1 illustrates a perspective view of an example camera with a folded optics arrangement, in accordance with some embodiments. Furthermore, FIG. 1 indicates directions of movement of a lens group and a prism of the folded optics arrangement of the camera, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Some embodiments include camera equipment outfitted with controls, magnets, and voice coil motors to improve the effectiveness of a miniature actuation mechanism for a compact camera module. More specifically, in some embodiments, compact camera modules include actuators to deliver functions such as autofocus (AF) and/or optical image stabilization (OIS). One approach to delivering a very compact actuator for AF and/or OIS is to use a voice coil motor (VCM) actuator.

In some embodiments, a camera may have a folded optics arrangement, an image sensor, and an actuator module. The folded optics arrangement may be configured to fold a path of light. The folded optics arrangement may include a first prism, a lens group, and a second prism. The lens group may include one or more lens elements. Furthermore, the lens group may be disposed between the first prism and the second prism. The image sensor may be configured to capture light that has passed through the first prism, the second prism, the lens group, and the second prism.

According to various embodiments, the actuator module may be configured to move the lens group relative to the image sensor. Additionally, or alternatively, the actuator module may be configured to tilt the first prism relative to the image sensor.

In various embodiments, the actuator module may include one or more VCM actuators. For instance, the actuator module may include a first OIS VCM actuator to tilt the first prism relative to the image sensor to provide OIS movement of an image (e.g., an image captured via the image sensor) in a first direction. Furthermore, the actuator module may include a second OIS VCM actuator to translate the lens group relative to the image sensor to provide OIS movement of the image in a second direction, e.g., a direction that is orthogonal to the first direction. Furthermore, the actuator module may include an AF VCM actuator to translate the lens group in a third direction, e.g., a direction that is orthogonal to the second direction. In some embodiments, to tilt the first prism relative to the image sensor, the first OIS VCM actuator may be configured to rotate the first prism about an axis that is parallel to the second direction.

In some embodiments, the second OIS VCM actuator may include one or more OIS magnets and one or more OIS coils. For instance, the OIS magnets may include a first OIS magnet and a second OIS magnet. The second OIS magnet may be opposite the first magnet with respect to the lens group in some examples. The OIS coils may include a first OIS coil and a second OIS coil. The first OIS coil may be located proximate the first magnet. The second OIS coil may be located proximate the second magnet and opposite the first OIS coil with respect to the lens group.

In some examples, the AF VCM actuator may include an AF magnet and an AF coil. The AF magnet and the AF coil may be located proximate one another and below the lens group in some cases.

In some embodiments, a system may include a camera having a folded optics arrangement. The folded optics arrangement may be configured to fold a path of light. The folded optics arrangement may include a first prism, a second prism, and a lens group. The lens group may include one or more lens elements. Furthermore, the lens group may be disposed between the first prism and the second prism. In some embodiments, the camera may further include an image sensor to capture light that has passed through the first prism, the lens group, and the second prism. According to various embodiments, the camera may further include an actuator module configured to move the lens group (e.g., relative to an image sensor) along two axes. Furthermore, the camera may include a suspension arrangement to suspend the lens group and allow movement of the lens group along the two axes.

In some examples, the suspension arrangement may include a spring and one or more wires. The spring may be attached to a lens barrel that holds the lens group and/or to a lens carrier that is coupled to the lens group. The wires may include a wire having a top end portion that is attached to the spring, and a bottom end portion that is attached to a fixed structure of the camera. In some embodiments, the suspension arrangement may further include a viscoelastic material that surrounds at least a portion of the wire to dampen movement of the wire. In some cases, the wire may extend, from the top end portion to the bottom end portion, in a direction that is orthogonal to an optical axis defined by the lens group.

In some examples, the suspension arrangement may include a flexure formed from a sheet. The flexure may have a top end portion that is attached to the lens barrel (and/or the lens carrier), and a bottom end portion that is attached to a fixed structure of the camera. In some embodiments, the suspension arrangement may further include a viscoelastic material that surrounds at least a portion of the flexure to dampen movement of the flexure. In some cases, the flexure may extend, from the top end portion to the bottom end portion, in a direction that is orthogonal to the optical axis defined by the lens group.

In some embodiments, a device may include a folded optics arrangement and an image sensor. The folded optics arrangement may be configured to fold a path of light. According to various embodiments, the folded optics arrangement may include a prism module and a lens group. The lens group may include one or more lens elements. The image sensor may be configured to capture light that has passed through the prism module and the lens group. In various embodiments, the prism module may include a prism, a prism carrier, a base, an actuator, and/or a flexure arrangement. The actuator may be configured to tilt the prism relative to the image sensor. The flexure arrangement may include one or more flexures that engage the prism carrier and the base.

In some examples, the prism may be a first prism of the folded optics arrangement, and the folded optics arrangement may further include a second prism. The lens group may be located between the first prism and the second prism. The image sensor may be configured to capture light that has passed through the first prism, the lens group, and the second prism.

In some embodiments, the actuator may be a VCM actuator that tilts the prism relative to the image sensor to provide OIS movement of an image, on the image sensor, in at least one direction. In some cases, the VCM actuator may include a magnet attached to the prism carrier, and a coil attached to the base. In other cases, the VCM actuator may include a coil attached to the prism carrier, and a magnet attached to the base. The VCM actuator may tilt the prism, together with the prism carrier, relative to the base in some embodiments.

In some embodiments, the flexure arrangement may include a first flexure and a second flexure. According to some examples, the first flexure may have a longest dimension in a first direction. Furthermore, the second flexure may have a longest dimension in a second direction, e.g., a direction that is orthogonal to the first direction. In some embodiments, the first flexure may define a vertically oriented plane, and the second flexure may define a horizontally oriented plane. An intersection between the vertically oriented plane and the horizontally oriented plan may define an axis about which the prism is tilted when actuated via the actuator.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

FIG. 1 illustrates a perspective view of an example camera 100 with a folded optics arrangement, in accordance with some embodiments. Furthermore, FIG. 1 indicates directions of movement of a lens group and a prism of the folded optics arrangement of the camera 100, in accordance with some embodiments. In some embodiments, the camera 100 may include one or multiple features, components, and/or functionality of embodiments described herein with reference to FIGS. 2A-10.

In some embodiments, the camera 100 may include a lens group 102, a first prism 104, a second prism 106, and an image sensor package 108. The lens group 102 may include one or more lens elements (e.g., held within a lens barrel and/or a lens carrier). In some embodiments, the lens group 102 may be located between the first prism 104 and the second prism 106, forming the folded optics arrangement. Light may follow an optical path 110 that is folded by the first prism 104 such that the light is directed towards the lens group 102, passes through the lens group 102, and is folded by the second prism 106 such that the light is directed towards the image sensor package 108. As will be discussed in further detail below, the lens group 102 and/or the first prism 104 may be coupled with an actuator module that is configured to move the lens group 102 and/or the first prism 104, e.g., to provide autofocus (AF) and/or optical image stabilization (OIS) movement.

As indicated in FIG. 1, in some embodiments, the lens group 102 may be shifted (e.g., by one or more actuators such as those discussed in further detail below) along axis 112 to provide AF movement. Additionally, or alternatively, the lens group 102 may be shifted along axis 114 to provide OIS movement in the OIS-Y directions (also referred to herein as "OIS-Y movement"). Additionally, or alternatively, the first prism 104 may be rotated (or tilted) about axis 114 to provide OIS movement in OIS-X directions (also referred to herein as "OIS-X movement"), which are orthogonal to the OIS-Y directions.

Figure 2A:
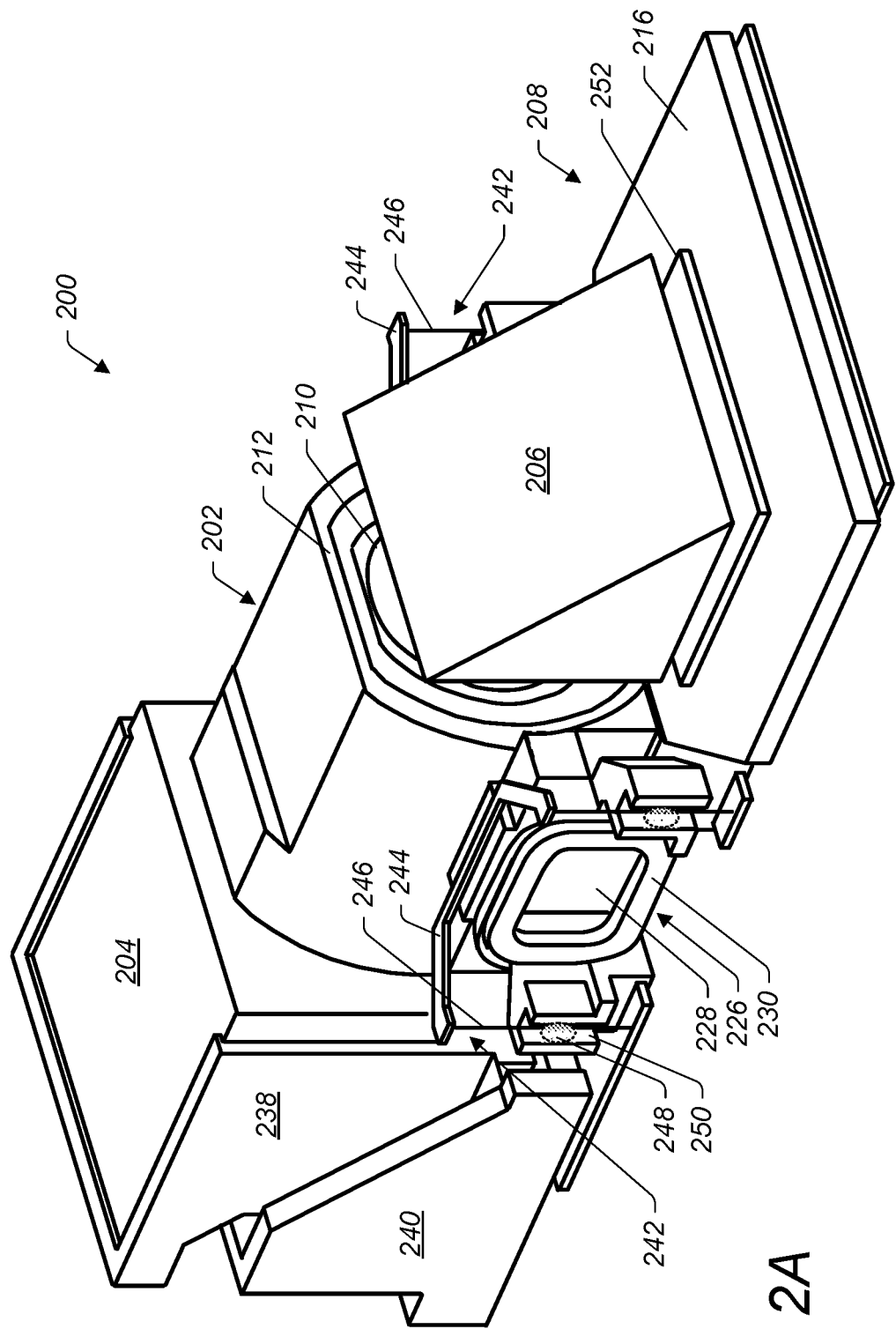
FIGS. 2A-2D each illustrates a respective view of an example camera having a folded optics arrangement, in accordance with some embodiments.
Figure 2B:
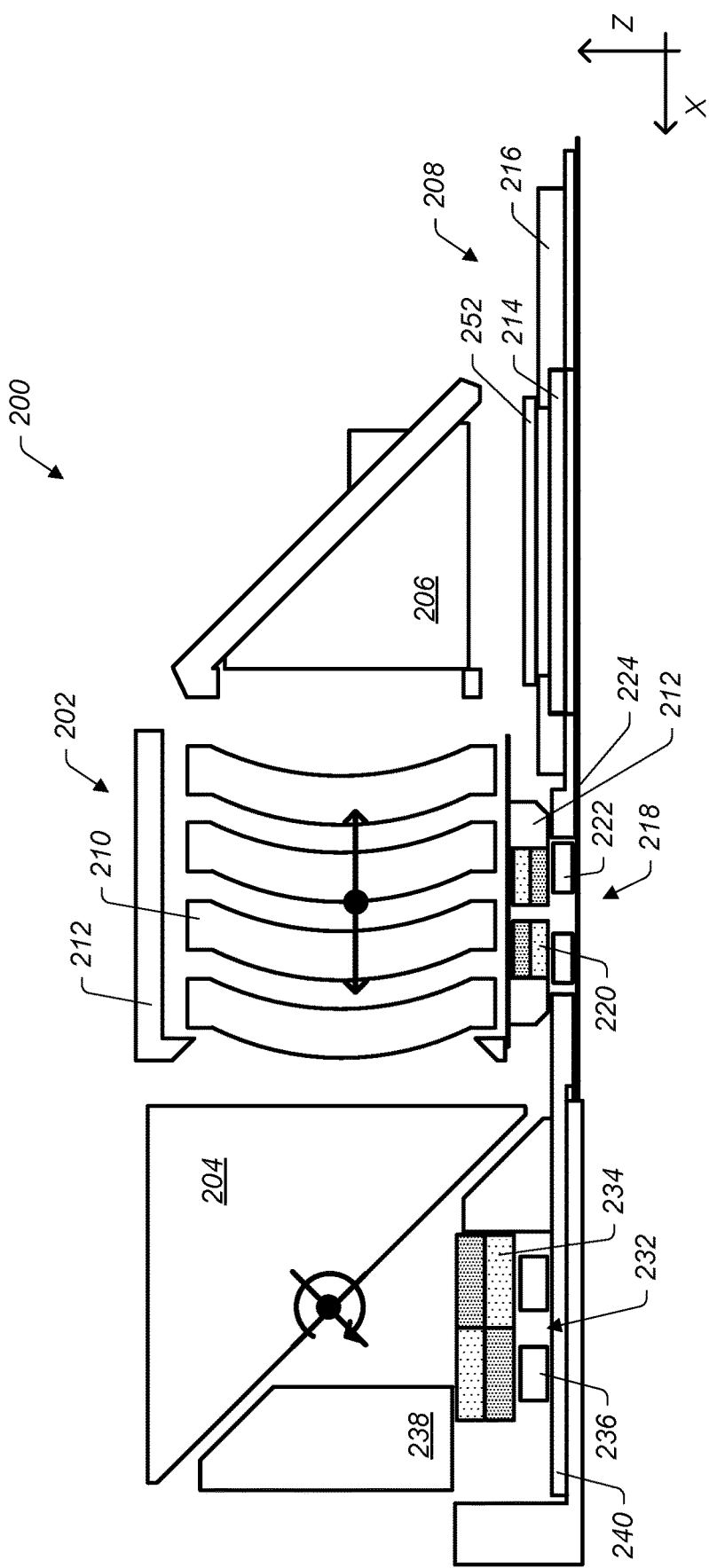
Figure 2C:
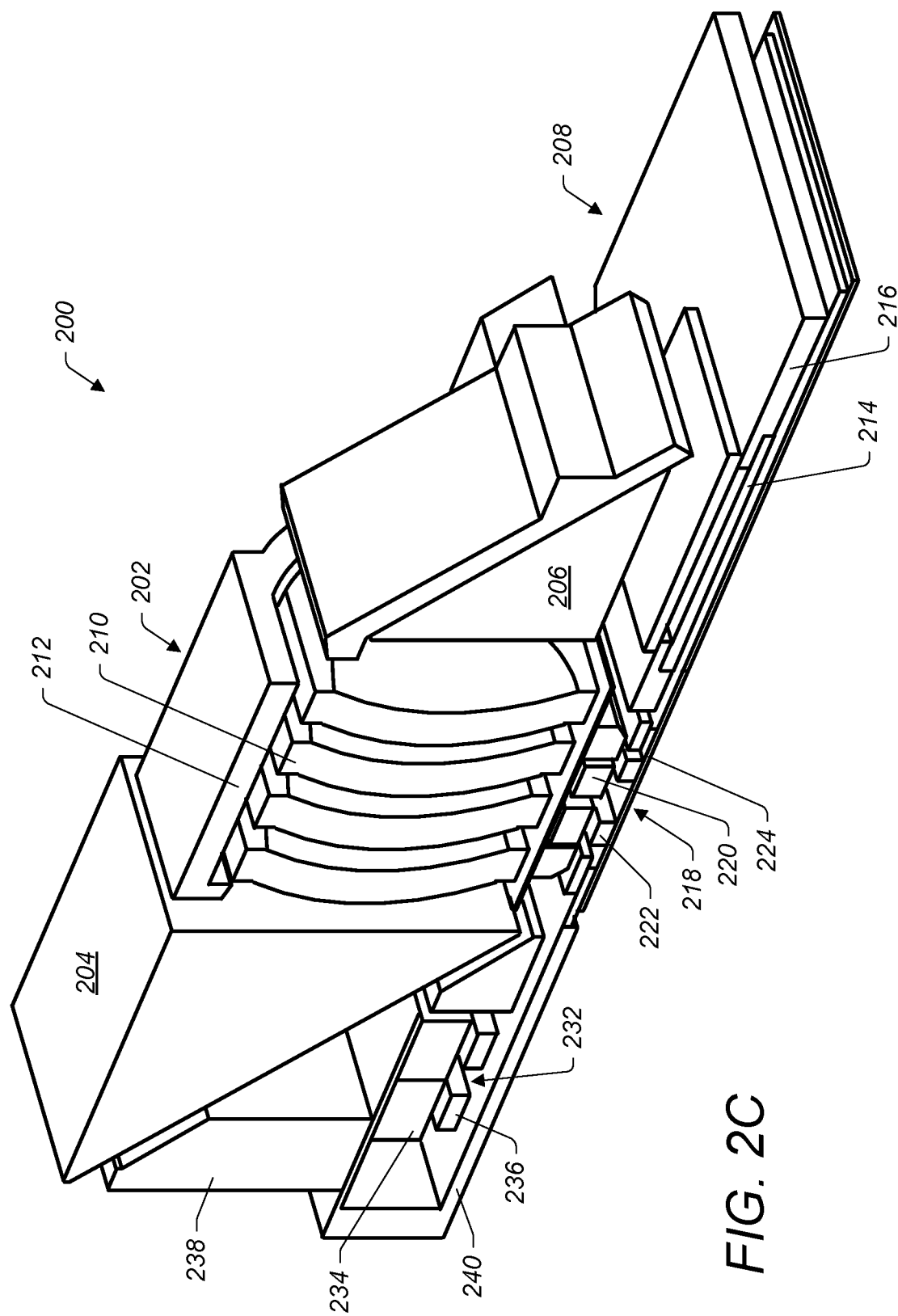
Figure 2D:
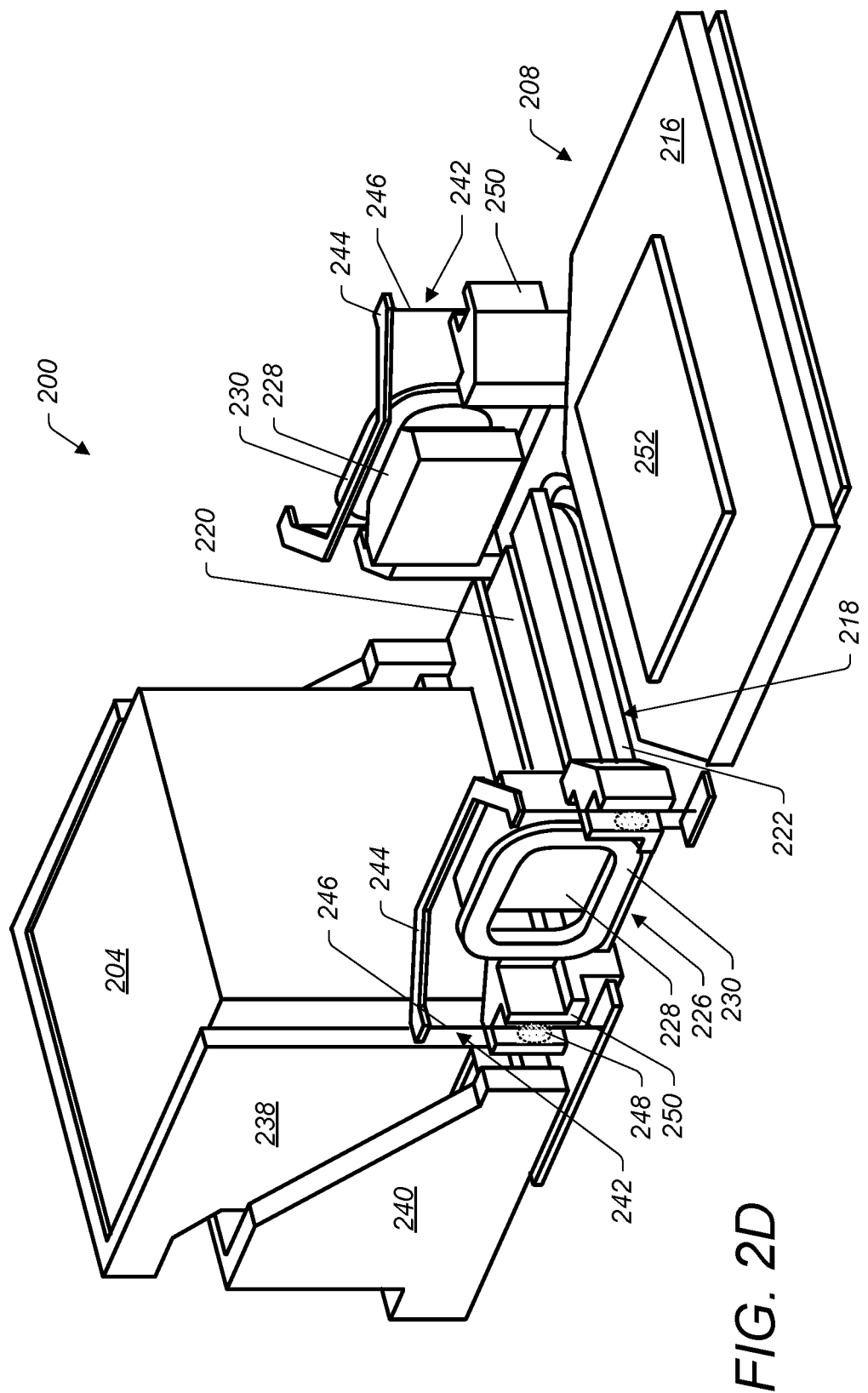

FIGS. 2A-2D each illustrates a respective view of an example camera 200 having a folded optics arrangement, in accordance with some embodiments. FIG. 2A is a perspective view of the camera that illustrates an example actuator arrangement and an example suspension arrangement of the camera. FIG. 2B is a side cross-sectional view of the camera that illustrates the actuator arrangement. FIG. 2C is a perspective cross-sectional view of the camera that illustrates the actuator arrangement. FIG. 2D is a perspective view of the camera that illustrates the actuator arrangement and the suspension arrangement. In some embodiments, the camera 200 may include one or multiple features, components, and/or functionality of embodiments described herein with reference to FIGS. 1 and 3A-9.

In some embodiments, the camera 200 may include a lens group 202, a first prism 204, a second prism 206, and an image sensor package 208. The lens group 202 may include one or more lens elements 210 disposed within a lens barrel 212 (and/or a lens carrier). In some embodiments, the image sensor package 208 may include an image sensor 214 and a substrate 216 that is coupled to and/or supports the image sensor 214.

According to various embodiments, the camera 200 may include an actuator module to move the lens group 202 and/or the first prism 204, e.g., to provide AF and/or OIS movement. In some embodiments, the actuator module may comprise a voice coil motor (VCM) actuator module that includes one or more VCM actuators. The VCM actuator module may include one or more magnets and one or more coils. The magnets and coils may magnetically interact (e.g., when electrical current is provided to the coils) to produce Lorentz forces that move the lens group 202 and/or the first prism 204.

In various embodiments, the actuator module may include an AF VCM actuator 218, e.g., as shown in FIGS. 2B-2D. The AF VCM actuator 218 may include an AF magnet 220

(e.g., a dual-pole magnet) and an AF coil 222. The AF magnet 220 and the AF coil 222 may be located proximate one another. In some embodiments, the AF magnet 220 may be coupled to the lens barrel 212. For instance, the AF magnet 220 may be attached to the lens barrel 212 such that the AF magnet 220 is located below the lens element(s) 210 and/or the lens group 202. In some cases, the lens barrel 212 may define a recess within which the AF magnet 220 may be at least partially disposed, e.g., as indicated in FIGS. 2B and 2C. In this manner, the impact of the AF VCM actuator 218 on the dimension of the system along its vertical axis (also referred to herein as the "system Z-axis") may be reduced. In some embodiments, the AF coil 222 may be coupled to a fixed (or static) structure 224 of the camera 200. For instance, the AF coil 222 may be attached to the fixed structure 224 such that the AF coil 222 is located below the AF magnet 220.

In some embodiments, the AF magnet 220 may have a longest dimension that is substantially parallel to a longest dimension of the AF coil 222. In some embodiments, the AF coil 222 may be oriented such that directions of current flow through the AF coil 222 define a plane that is substantially parallel to the image sensor 214. The AF coil 222 may be electrically driven to magnetically interact with the AF magnet 220 to produce Lorentz forces that move the AF magnet 220, the lens barrel 212, and/or the lens group 202 along an axis (e.g., along axis 112 of FIG. 1) to provide AF movement of the lens group 202. The AF coil 222, being attached to the fixed structure 224, may remain stationary relative to the movement of the AF magnet 220.

While the AF magnet 220 and the AF coil 222 are shown as being coupled to the lens barrel 212 and the fixed structure 224, respectively, it should be understood that in some embodiments the AF coil 222 may be coupled to the lens barrel 212, and the AF magnet 220 may be coupled to the fixed structure 224.

In various embodiments, the actuator module may include an OIS-Y VCM actuator 226, e.g., as shown in FIGS. 2A and 2D. The OIS-Y VCM actuator 226 may include one or more OIS-Y magnets 228 (e.g., single-pole magnets) and one or more OIS-Y coils 230. In some embodiments, each OIS-Y magnet 228 may be located proximate a respective OIS-Y coil 230. For instance, the OIS-Y VCM actuator 226 may include a pair of OIS-Y magnets 228 that are opposite one another with respect to the lens group 202, and a pair of OIS-Y coils 230 that are opposite one another with respect to the lens group 202, e.g., as indicated in FIG. 2D.

In some embodiments, the OIS-Y magnets 228 may be coupled to the lens barrel 212. For instance, each OIS-Y magnet 228 may be attached to the lens barrel 212 such that it is located between the lens barrel 212 and a respective OIS-Y coil 230. In some embodiments, the OIS-Y coils 230 may be coupled to a fixed structure (e.g., fixed structure 224 and/or another fixed structure). According to some examples, the fixed structure 224 may be a flex circuit that is common to (or shared by) the OIS-Y coils 230 and the AF coil 222. That is, the OIS-Y coils 230 and the AF coil 222 may be formed on, embedded in, and/or otherwise coupled to the common flex circuit. Portions of the common flex circuit at which the OIS-Y coils 230 are located may be folded relative to a portion of the common flex circuit at which the AF coil 222 is located, such that the OIS-Y coils 230 are oriented at an angle (e.g., 90 degrees) to the AF coil 222. In some embodiments, the OIS-Y coils 230 may be oriented such that directions of current flow through the OIS-Y coils 230 define a respective plane that is substantially orthogonal to the AF coil 222 and/or the image sensor 214. The OIS-Y coils 230 may be electrically driven to magnetically interact with the OIS-Y magnets 228 to produce Lorentz forces that move the OIS-Y magnets 228, the lens barrel 212, and/or the lens group 202 along an axis (e.g., along axis 114 of FIG. 1) to provide OIS-Y movement of an image on the image sensor 214. The OIS-Y coils 230, being attached to the fixed structure, may remain stationary relative to the movement of the OIS-Y magnets 228.

While the OIS-Y magnets 228 and the OIS-Y coils 230 are shown as being coupled to the lens barrel 212 and the fixed structure, respectively, it should be understood that in some embodiments the OIS-Y coils 230 may be coupled to the lens barrel 212, and the OIS-Y magnets 228 may be coupled to the fixed structure.

In various embodiments, the actuator module may include an OIS-X VCM actuator 232, e.g., as shown in FIGS. 2B and 2C. The OIS-X VCM actuator 232 may be configured to move the first prism 204. According to various examples, the OIS-X VCM actuator 232 may be configured to tilt the first prism 204 about an axis (e.g., about axis 114 of FIG. 1) to provide OIS-X movement of the image on the image sensor 214. For instance, the OIS-X movement of the image on the image sensor may be orthogonal to the OIS-Y movement of the image on the image sensor.

In some embodiments, the OIS-X VCM actuator 232 may include an OIS-X magnet 234 (e.g., a dual-pole magnet) and an OIS-X coil 236, e.g., as shown in FIGS. 2B and 2C. The OIS-X magnet 234 may be located proximate the OIS-X coil 236. In some cases, the OIS-X magnet 234 may be coupled to a structure that moves together with the prism 204, and the OIS-X coil 236 may be coupled to a fixed structure that is stationary relative to movement of the prism 204. For instance, the structure that moves together with the prism 204 may be a prism carrier 238 and/or a prism base 240 that are part of a prism module, such as the prism module 400 described below with reference to FIGS. 4A-4D. In some cases, the fixed structure that is stationary relative to movement of the prism 204 may be the prism base 240, the fixed structure 224, and/or another fixed structure.

In some embodiments, the OIS-X magnet 234 may have a longest dimension that is substantially parallel to a longest dimension of the OIS-X coil 236. In some embodiments, the OIS-X coil 236 may be oriented such that directions of current flow through the OIS-X coil 236 define a plane that is substantially parallel to the image sensor 214. The OIS-X coil 236 may be electrically driven to magnetically interact with the OIS-X magnet 234 to produce Lorentz forces that tilt the prism 204 about an axis (e.g., about axis 114 of FIG. 1) to provide OIS-X movement of the image on the image sensor 214.

While the OIS-X magnet 234 and the OIS-X coil 236 are described as being coupled to a structure that moves together with the prism 204 and a fixed structure, respectively, it should be understood that in some embodiments the OIS-X coil 236 may be coupled to the structure that moves together with the prism 204, and the OIS-X magnet 234 may be coupled to the fixed structure.

In various embodiments, the OIS-X VCM actuator 232 may be tucked within a space under a portion of the first prism 204, e.g., as indicated in FIGS. 2B and 2C. In this manner, the impact of the OIS-X VCM actuator 232 on the dimension of the system along its long axis (also referred to herein as the "system X-axis") and along the system Z-axis may be reduced or eliminated.

As will be discussed in further detail below with reference to FIGS. 4A-4D, the prism module may include a flexure arrangement. In some instances, the flexure arrangement may be used to control movement of the first prism 204.

According to various embodiments, the camera 200 may include a suspension arrangement 242, e.g., as shown in FIGS. 2A and 2D. For instance, the suspension arrangement 242 may suspend the lens group 202. Additionally, or alternatively, the suspension arrangement 242 may allow for movement of the lens group 202 along multiple axes. For example, the suspension arrangement 242 may provide for controlled AF and/or OIS-Y movement. In some instances, the suspension arrangement 242 may be configured to limit movement of the lens group 202 along an axis (e.g., an axis that is orthogonal to axis 112 and axis 114 of FIG. 1).

In some embodiments, the suspension arrangement 242 may include one or more springs 244 and one or more suspension wires 246. For instance, the suspension arrangement 242 may include a pair of springs 244 that are opposite one another with respect to the lens group 202, e.g., as indicated in FIGS. 2A and 2D. Each of the springs 244 may be attached to the lens barrel 212 in some embodiments. In some examples, the springs 244 may extend from the lens barrel 212 along a plane that is above the OIS-Y magnet 228 and/or the OIS-Y coil 230. Each suspension wire 246 may extend downward from a respective portion of a respective spring 244. For example, each spring 244 may have one or more respective end portions, and each suspension wire 246 may have a top end portion that is attached to a respective end portion of a respective spring 244. Furthermore, each suspension wire 246 may have a bottom end portion that is attached to a fixed structure (e.g., fixed structure 224 and/or another fixed structure).

In some embodiments, the lens element(s) 210 of the lens group 202 may define an optical axis that is substantially parallel to a plane defined by the spring(s) 244. Additionally, or alternatively, the suspension wire(s) 246 may extend in directions that are substantially orthogonal to the optical axis and/or the plane defined by the spring(s) 244.

In various embodiments, the suspension arrangement 242 may provide compliance and/or stiffness for controlled movement of the lens barrel 212 and/or the lens group 202. According to some examples, the suspension wires 246 may flex to allow controlled AF movement (e.g., along axis 112 of FIG. 1) and/or OIS-Y movement (e.g., along axis 114 of FIG. 1) of the lens group 202. In some instances, e.g., during such AF and/or OIS-Y movement, the springs 244 may not flex (or may flex substantially less than the suspension wires 246). Moreover, in some cases, the springs 244 may substantially limit movement in directions orthogonal to directions of AF movement and/or OIS-Y movement. In some embodiments, the springs 244 may be stiff, but provide a small level of compliance (e.g., in directions orthogonal to directions of AF movement and/or OIS-Y movement) to prevent the suspension wires 246 from snapping or otherwise being damaged in certain circumstances (e.g., a drop event).

In some embodiments, the camera 200 and/or the suspension arrangement 242 may include a damper that dampens movement of one or more of the suspension wires 246. For instance, the suspension wires 246 may be at least partially disposed within a viscoelastic material 248 (e.g., a viscoelastic gel). In some examples, one or more structures 250 may form one or more pockets within which the viscoelastic material 248 may be disposed. The viscoelastic material 248 may be located along any portion(s) of the length of a suspension wire 246. In some embodiments, the viscoelastic material 248 may be located along a central portion of the length of a suspension wire 246.

In some examples, the camera 200 and/or the image sensor package 208 may include a filter 252 (e.g., an infrared filter) coupled to the substrate 216. For instance, the filter 252 may be located above the image sensor 214 such that light passes through the filter 262 before reaching the image sensor 214.

According to some embodiments, the camera 200 may include a lens carrier (not shown). The lens carrier may at least partially surround the lens element(s) 210 and/or the lens barrel 212. In various embodiments, one or more components described herein as having a structural and/or positional relationship with respect to the lens barrel 212 (e.g., being coupled to the lens barrel, being located below the lens barrel, etc.) may additionally or alternatively apply with respect to the lens carrier.

Figure 3:
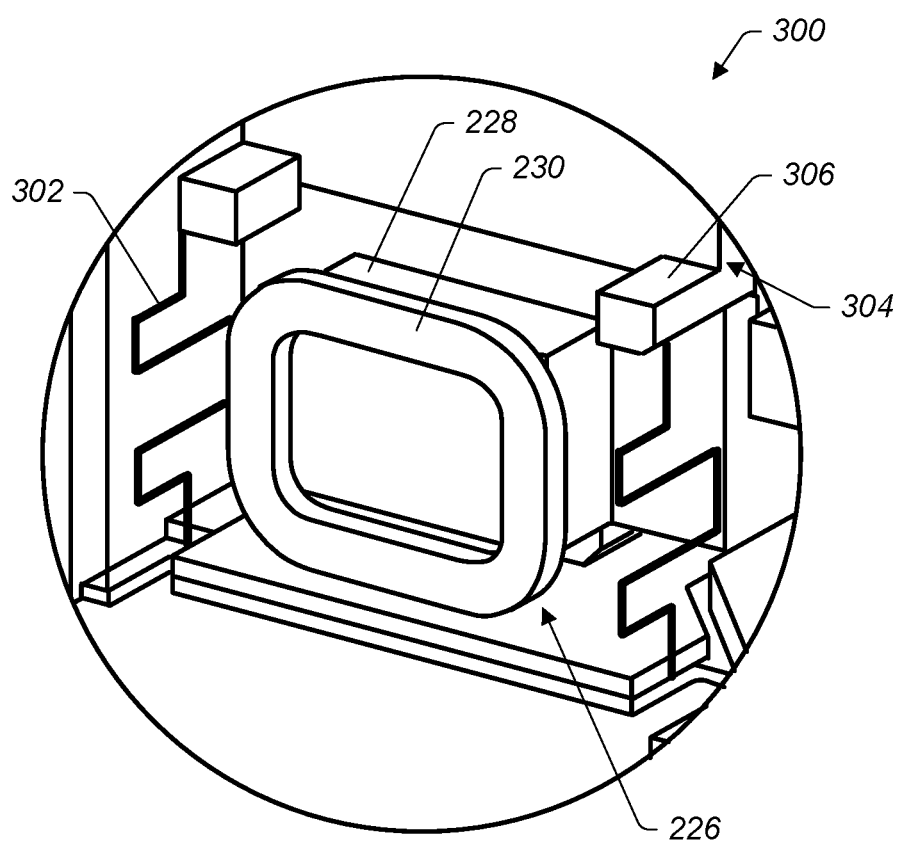
FIG. 3 illustrates a perspective view of another example suspension arrangement for a camera having a folded optics arrangement, in accordance with some embodiments.

FIG. 3 illustrates a perspective view of another example suspension arrangement 300 for a camera having a folded optics arrangement, in accordance with some embodiments. In some embodiments, the suspension arrangement 300 may include one or multiple features, components, and/or functionality of embodiments described herein with reference to FIGS. 1-2D and 4A-9.

In some embodiments, the suspension arrangement 300 may suspend a lens group (e.g., lens group 102 of FIG. 1, lens group 202 of FIG. 2, etc.). Additionally, or alternatively, the suspension arrangement 300 may allow for movement of the lens group along multiple axes. For example, the suspension arrangement 300 may provide for controlled AF and/or OIS-Y movement. In some instances, the suspension arrangement 300 may be configured to limit movement of the lens group along an axis (e.g., an axis that is orthogonal to axis 112 and axis 114 of FIG. 1).

In some embodiments, the suspension arrangement 300 may include one or more flexures 302. In some examples, a flexure 302 may be formed from a sheet. For instance, a sheet may be etched to form the flexure 302. In some embodiments the suspension arrangement 300 may include two pairs of flexures 302—a first pair of flexures 302 and a second pair of flexures 302 that are opposite one another with respect to the lens group.

In some embodiments, a top end portion of a flexure 302 may be coupled to a lens barrel 304 of the lens group. In some cases, one or more protrusions 306 may extend from the lens barrel 304, and the top end portion of the flexure 302 may be attached to a protrusion 306. Furthermore, a bottom end portion of the flexure 302 may be coupled to a fixed structure of the camera. The extension of the flexure 302 from the top end portion to the bottom end portion may define a plane (e.g., a vertically oriented plane) that is orthogonal to an optical axis defined by the lens element(s) of the lens group. The plane defined by the flexure 302 may be orthogonal to a plane defined by the OIS-Y coil(s) 230. In some examples, a pair of flexures 302 may be opposite one another with respect to the OIS-Y VCM actuator 226, e.g., as indicated in FIG. 3. For instance, the OIS-Y magnet 228 and the OIS-Y coil 230 of the OIS-Y VCM actuator 226 may be located between the pair of flexure 302.

In various embodiments, the suspension arrangement 300 may provide compliance and/or stiffness for controlled movement of the lens barrel 304 and/or the lens group. According to some examples, the flexures 302 may flex to allow controlled AF movement (e.g., along axis 112 of FIG. 1) and/or OIS-Y movement (e.g., along axis 114 of FIG. 1) of the lens group. In some instances, the flexures 302 may substantially limit movement in directions orthogonal to directions of AF movement and/or OIS-Y movement.

While not shown in FIG. 3, the suspension arrangement 300 and/or the camera may include a damper that dampens movement of one or more of the flexures 302, e.g., as described above with reference to FIGS. 2A and 2D. For instance, the flexures 302 may be at least partially disposed within a viscoelastic material (e.g., a viscoelastic gel). In some examples, one or more structures may form one or more pockets within which the viscoelastic material may be disposed. The viscoelastic material may be located along any portion(s) of the flexure 302. In some embodiments, the viscoelastic material may be located along a central portion of the length of a flexure 302.

Figure 4A:
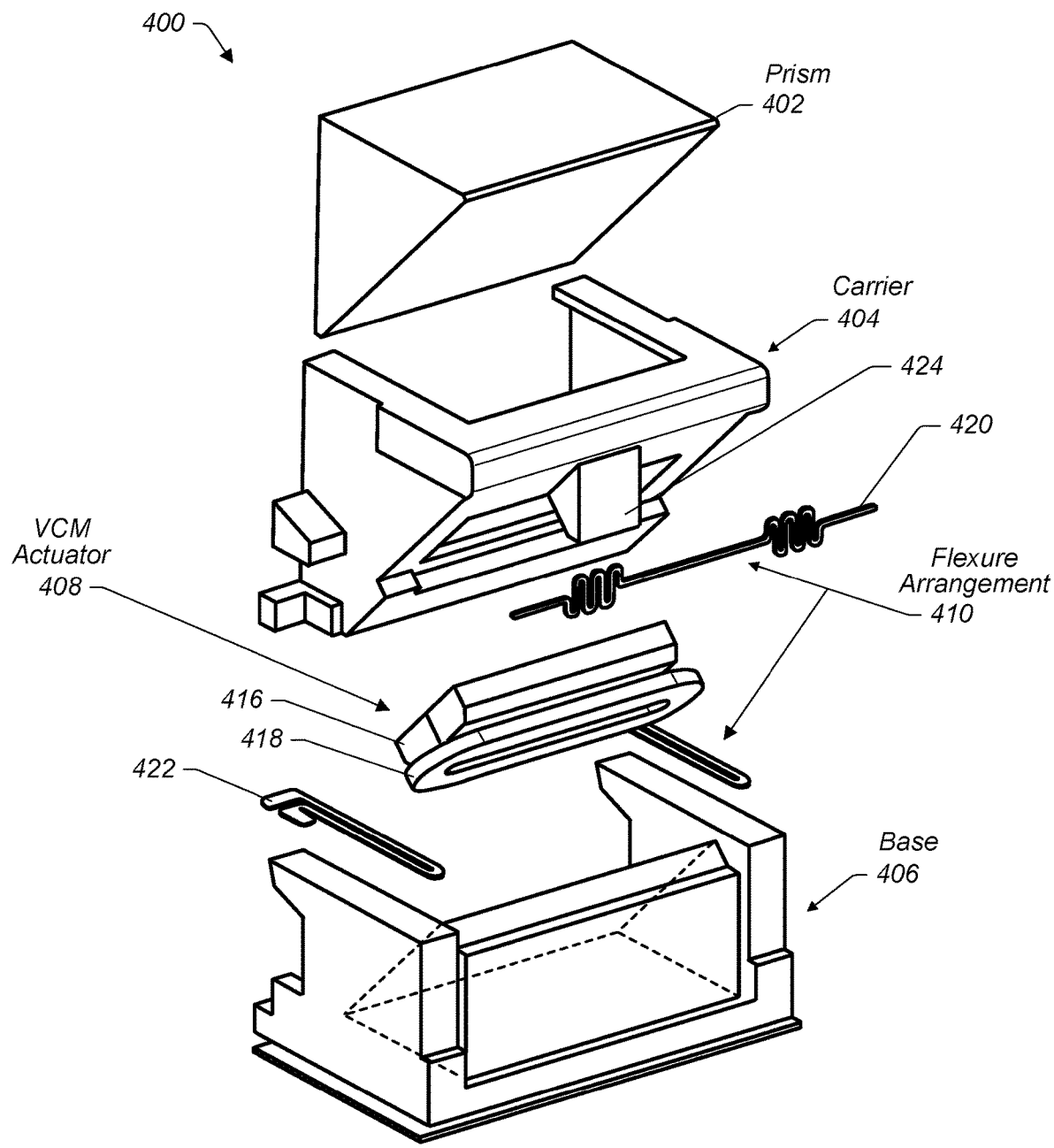
FIGS. 4A-4D each illustrates a respective view of an example prism module that may include an example actuator and an example flexure arrangement to control movement of a prism within a camera having a folded optics arrangement, in accordance with some embodiments.
Figure 4B:
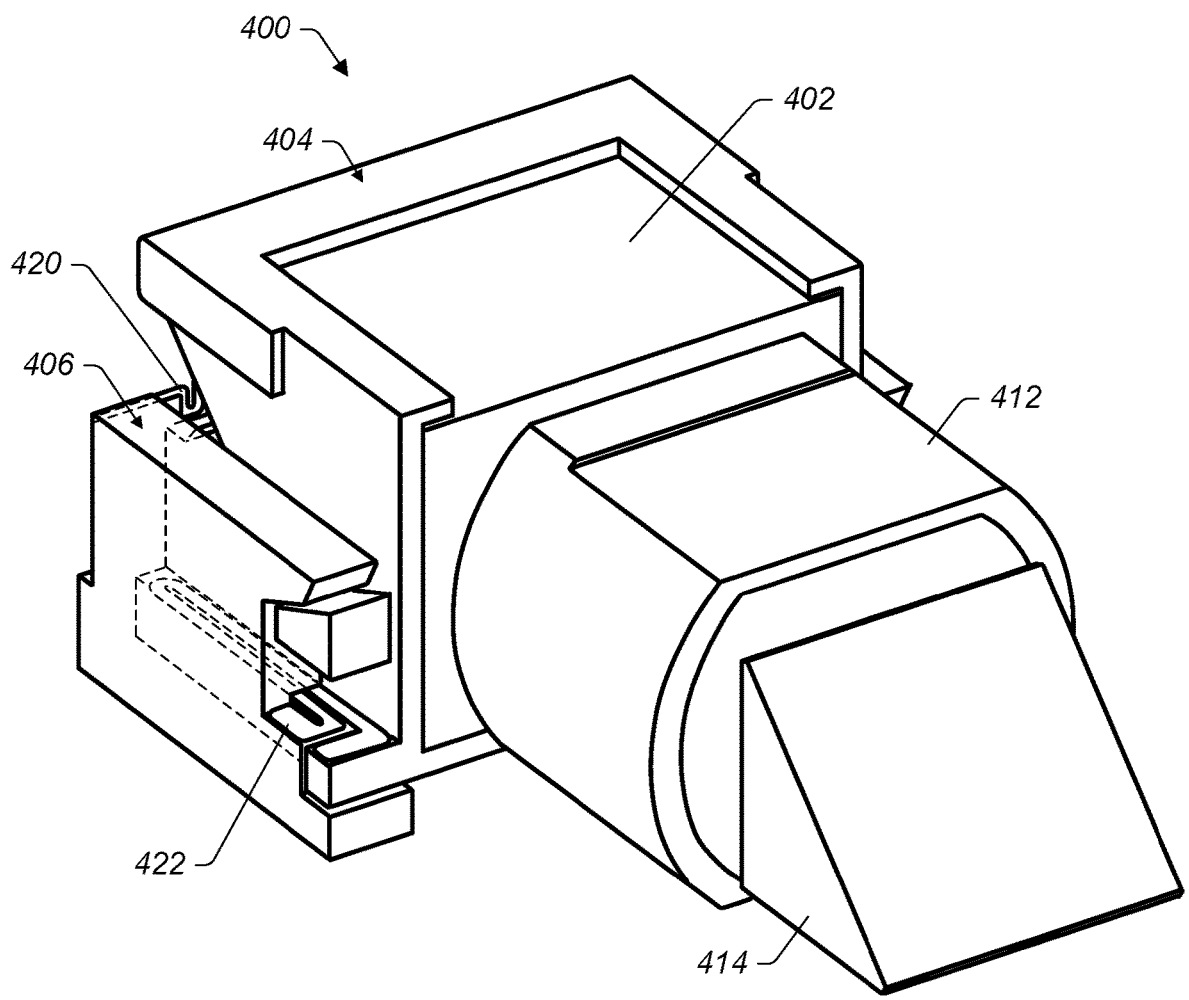
Figure 4C:
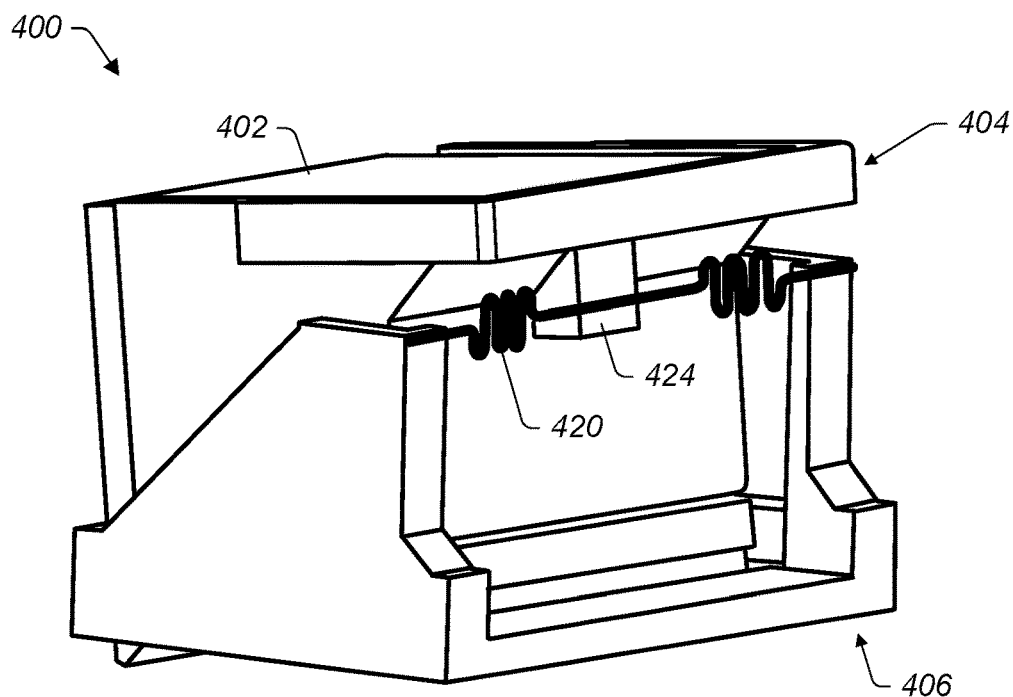
Figure 4D:
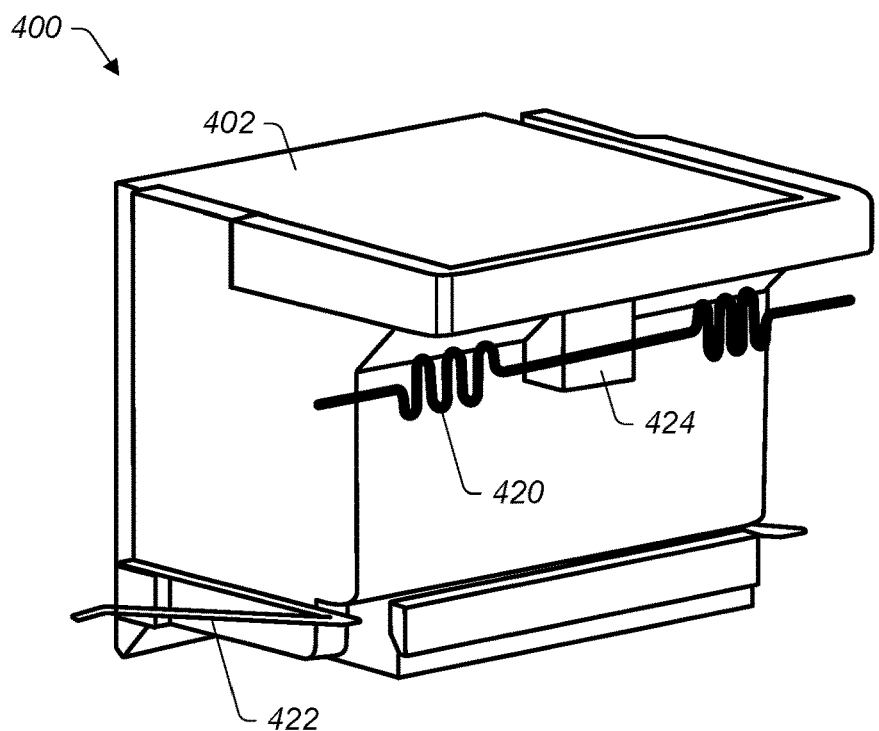

FIGS. 4A-4D each illustrates a respective view of an example prism module 400 that may include an example actuator and an example flexure arrangement to control movement of a prism within a camera having a folded optics arrangement, in accordance with some embodiments. FIG. 4A shows an exploded view of the prism module 400. FIG. 4B shows a perspective view of the prism module 400 along with other components of the folded optics arrangement of the camera. FIG. 4C shows a perspective view of the prism module 400 that illustrates an aspect of how the flexure arrangement engages with a prism carrier and a base structure. FIG. 4D shows a perspective view of the prism module 400 that illustrates an aspect of how the flexure arrangement is coupled with the prism carrier. In some embodiments, the prism module 400, the actuator, and/or the flexure arrangement may include one or multiple features, components, and/or functionality of embodiments described herein with reference to FIGS. 1-3 and 5-9.

In some embodiments, the prism module 400 may include a prism 402, a prism carrier 404, and a base 406. Furthermore, the prism module 400 may include a voice coil motor (VCM) actuator 408 and/or a flexure arrangement 410, e.g., to provide controlled tilt movement of the prism 402 (together with the prism carrier 404) relative to the base 406. In various embodiments, the prism 402 may be one of multiple prisms in the folded optics arrangement of the camera. For instance, the prism 402 may be a first prism, and the folded optics arrangement may further include a lens group 412 and a second prism 414. The lens group 412 may be located between the first prism 402 and the second prism 414, e.g., as shown in FIG. 4B.

According to some examples, the VCM actuator 408 may include a magnet 416 (e.g., a dual-pole magnet) and a coil 418. The magnet 416 may be located proximate the coil 418. In some embodiments, the magnet 416 may be attached to the prism carrier 404, and the coil 416 may be attached to the base 406. In other embodiments, the coil 418 may be attached to the prism carrier 404, and the magnet 416 may be attached to the base 406. The prism carrier 404 may hold or otherwise support the prism 402 such that the prism 402 moves together with the prism carrier 404. The base 406 may be a fixed structure that is stationary relative to movement of the prism 402 and/or the prism carrier 404. In some embodiments, the magnet 416 may have a longest dimension that is substantially parallel to a longest dimension of the coil 418.

In some embodiments, the flexure arrangement 410 may include one or more upper flexures 420 and one or more lower flexures 422. According to some examples, an upper flexure 420 may be attached to the base 406. For instance, the upper flexure 420 may have a pair of end portions that are opposite one another. A first end portion of the upper flexure 420 may be attached to a first side of the base 406, and a second end portion of the upper flexure 420 may be attached to a second side of the base 406 that is opposite the first side of the base 406. Furthermore, a portion of the upper flexure 420 may engage a portion of the prism carrier 404. For instance, as indicated in FIGS. 4A-4D, a middle portion of the upper flexure 420 may engage a protrusion 424 of the prism carrier 404. The protrusion 424 may extend from a side of the prism 402 that faces away from the lens group in some embodiments. In some examples, the upper flexure 420 may engage the protrusion 424 such that the upper flexure 420 flexes when the prism 402 is tilted via the VCM actuator 408. In some examples, the middle portion of the upper flexure 420 may be attached to the protrusion 424.

In some embodiments, a lower flexure 422 may have a first end portion that is attached to a first side of the base 406, and a second end portion that is attached to a corresponding first side of the prism carrier 404, e.g., as indicated in FIGS. 4A and 4B. As indicated in FIG. 4A, the flexure arrangement 410 may include a pair of lower flexures 422 that are opposite one another with respect to the prism 402 in some embodiments. FIG. 4D illustrates an example of how a lower flexure 422 may flex when the prism 402 is tilted via the VCM actuator 408. In FIG. 4D, the base 406 is not shown.

According to various examples, the upper flexure 420 may be located closer to an upper surface of the prism 402 than the lower flexures 422. In some examples, the upper flexure 420 may have a longest dimension in a first direction. Furthermore, each of the lower flexures 422 may have a respective longest dimension in a second direction, e.g., in a direction that is orthogonal to the first direction. In some embodiments, the upper flexure 420 may define a vertically oriented plane. The lower flexures 422 may define a horizontally oriented plane. In some instances, an intersection between the vertically oriented plane and the horizontally oriented plane may define an axis about which the prism 402 is tilted via the VCM actuator 408.

Figure 5:
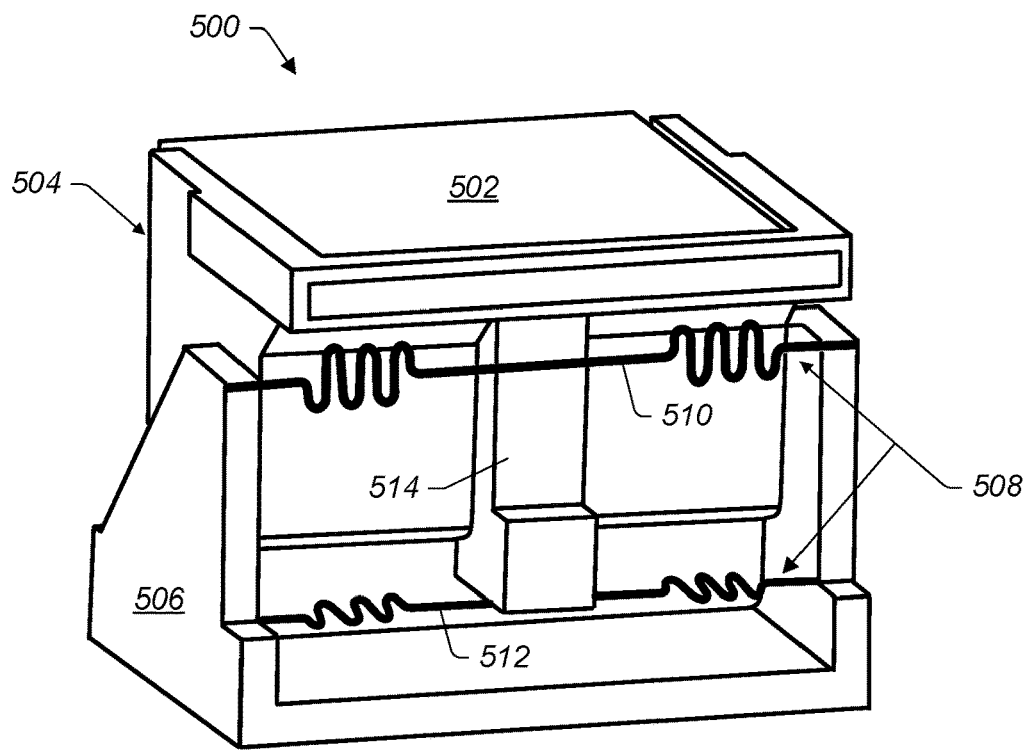
FIG. 5 illustrates a perspective view of another example prism module that may include another example flexure arrangement to control movement of a prism within a camera having a folded optics arrangement, in accordance with some embodiments.

FIG. 5 illustrates a perspective view of another example prism module 500 that may include another example flexure arrangement to control movement of a prism within a camera having a folded optics arrangement, in accordance with some embodiments. In some embodiments, the prism module and/or the flexure arrangement 502 may include one or multiple features, components, and/or functionality of embodiments described herein with reference to FIGS. 1-4D and 6-9.

In some embodiments, the prism module 500 may include a prism 502, a prism carrier 504, a base 506, and the flexure arrangement 508. The flexure arrangement 508 may include an upper flexure 510 and a lower flexure 512.

According to some examples, the upper flexure 510 may be attached to the base 506. For instance, the upper flexure 510 may have a pair of end portions that are opposite one another. A first end portion of the upper flexure 510 may be attached to a first side of the base 506, and a second end portion of the upper flexure 510 may be attached to a second side of the base 506 that is opposite the first side of the base 506. Furthermore, a portion of the upper flexure 510 may engage a portion of the prism carrier 504. For instance, as indicated in FIG. 5, a middle portion of the upper flexure 510 may engage a protrusion 514 of the prism carrier 504. The protrusion 514 may extend from a side of the prism 502 that faces away from the lens group in some embodiments. In some examples, the upper flexure 510 may engage a first portion of the protrusion 514 such that the upper flexure 510 flexes when the prism 502 is tilted. In some examples, the middle portion of the upper flexure 510 may be attached to the first portion of the protrusion 514.

In some embodiments, the lower flexure 512 may be attached to the base 506. For instance, the lower flexure 512 may have a pair of end portions that are opposite one another. A first end portion of the lower flexure 512 may be attached to a first side of the base 506, and a second end portion of the lower flexure 512 may be attached to a second side of the base 506 that is opposite the first side of the base 506. Furthermore, a portion of the lower flexure 512 may engage a portion of the prism carrier 504. For instance, as indicated in FIG. 5, a middle portion of the lower flexure 512 may engage the protrusion 514. In some embodiments, the lower flexure 512 may engage a second portion of the protrusion 514 such that the lower flexure 512 flexes when the prism 502 is tilted. In some examples, the middle portion of the lower flexure 512 may be attached to the second portion of the protrusion 514.

According to some embodiments, the first portion of the protrusion 514 may be a first surface that engages the upper flexure 510, and the second portion of the protrusion 514 may be a second surface that engages the lower flexure 512. In some instances, the first surface may be substantially orthogonal to second surface.

In some cases, the upper flexure 510 may be located closer to an upper surface of the prism 502 than the lower flexure 512. In some examples, the upper flexure 510 and the lower flexure 512 may each have a respective longest dimension in a same direction. In some embodiments, the upper flexure 510 may define a vertically oriented plane. The lower flexure 512 may define a horizontally oriented plane. In some instances, an intersection between the vertically oriented plane and the horizontally oriented plane may define an axis about which the prism 502 is tilted.

Figure 6:
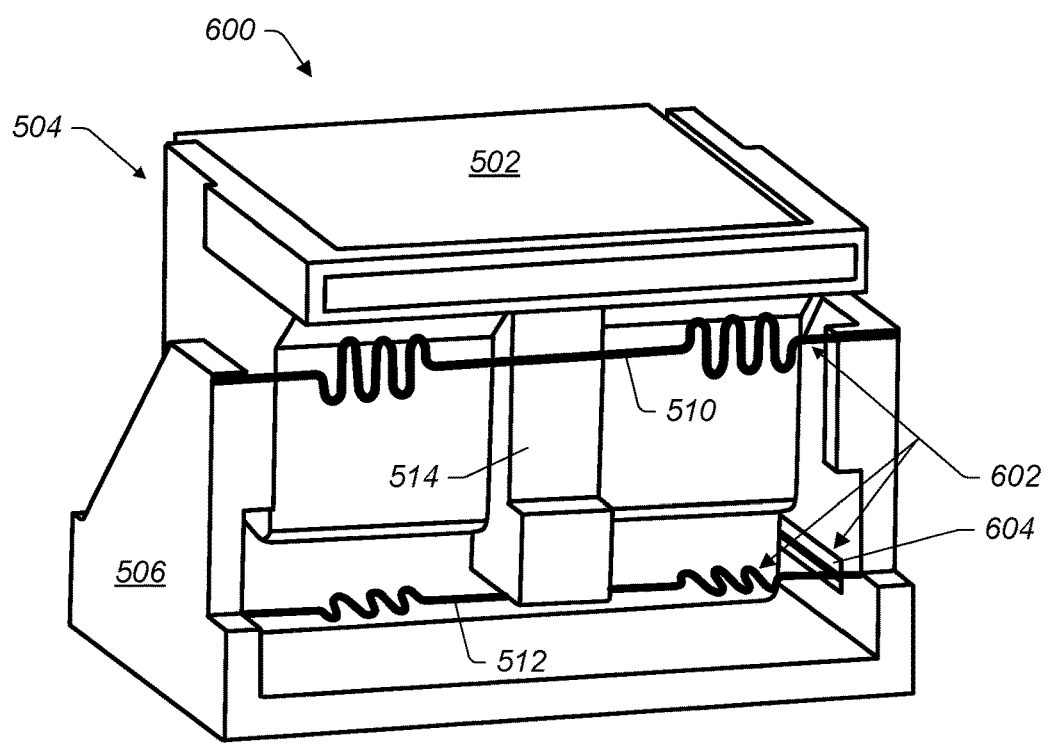
FIG. 6 illustrates a perspective view of yet another example prism module that may include another example flexure arrangement to control movement of a prism within a camera having a folded optics arrangement, in accordance with some embodiments.

FIG. 6 illustrates a perspective view of yet another example prism module 600 that may include yet another example flexure arrangement to control movement of a prism within a camera having a folded optics arrangement, in accordance with some embodiments. In some embodiments, the prism module 600 and/or the flexure arrangement may include one or multiple features, components, and/or functionality of embodiments described herein with reference to FIGS. 1-5 and 7-9.

In some embodiments, the prism module 600 may include prism 502, prism carrier 504, base 506, upper flexure 510, lower flexure 512, and protrusion 514 described above with reference to FIG. 5. The flexure arrangement 602 of the prism module 600, however, may further include another set of one or more lower flexures 604. The lower flexures 604 may be like the lower flexures 422 described above with reference to FIGS. 4A-4D.

Figure 7:
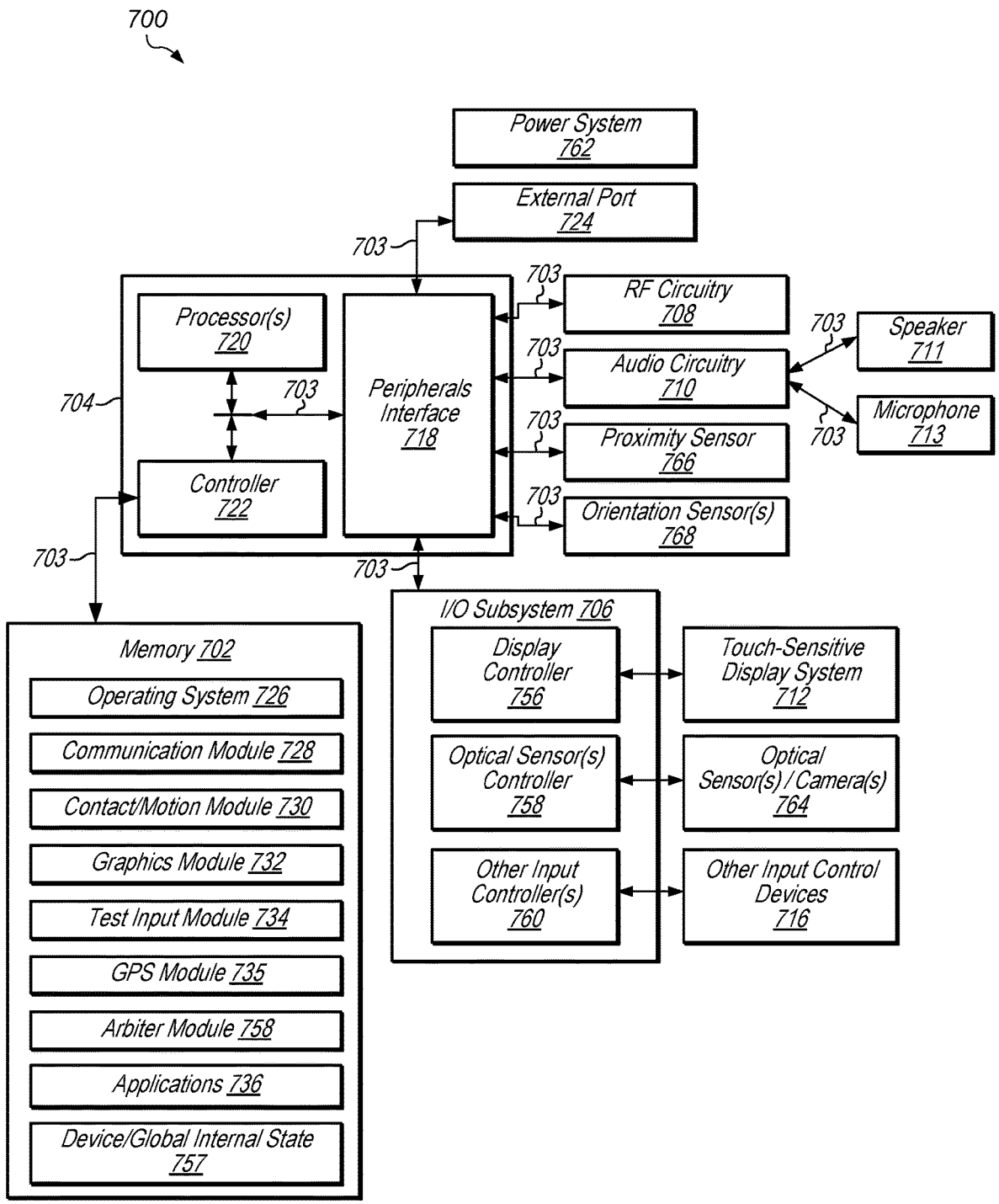
FIG. 7 illustrates a block diagram of an example portable multifunction device that may include a camera having a folded optics arrangement, in accordance with some embodiments.

FIG. 7 illustrates a block diagram of an example portable multifunction device 700 that may include a camera having a folded optics arrangement, in accordance with some embodiments. In some embodiments, the portable multifunction device 700 may include one or multiple features, components, and/or functionality of embodiments described herein with reference to FIGS. 1-6, 8, and 9.

Camera(s) 764 is sometimes called an "optical sensor" for convenience, and may also be known as or called an optical sensor system. Device 700 may include memory 702 (which may include one or more computer readable storage mediums), memory controller 722, one or more processing units (CPUs) 720, peripherals interface 718, RF circuitry 708, audio circuitry 710, speaker 711, microphone 713, input/output (I/O) subsystem 706, other input or control devices 716, and external port 724. Device 700 may include one or more optical sensors 764. These components may communicate over one or more communication buses or signal lines 703.

It should be appreciated that device 700 is only one example of a portable multifunction device, and that device 700 may have more or fewer components than shown, may combine two or more components, or may have a different configuration or arrangement of the components. The various components shown in FIG. 7 may be implemented in hardware, software, or a combination of hardware and software, including one or more signal processing and/or application specific integrated circuits.

Memory 702 may include high-speed random access memory and may also include non-volatile memory, such as one or more magnetic disk storage devices, flash memory devices, or other non-volatile solid-state memory devices. Access to memory 702 by other components of device 700, such as CPU 720 and the peripherals interface 718, may be controlled by memory controller 722.

Peripherals interface 718 can be used to couple input and output peripherals of the device to CPU 720 and memory 702. The one or more processors 720 run or execute various software programs and/or sets of instructions stored in memory 702 to perform various functions for device 700 and to process data.

In some embodiments, peripherals interface 718, CPU 720, and memory controller 722 may be implemented on a single chip, such as chip 704. In some other embodiments, they may be implemented on separate chips.

RF (radio frequency) circuitry 708 receives and sends RF signals, also called electromagnetic signals. RF circuitry 708 converts electrical signals to/from electromagnetic signals and communicates with communications networks and other communications devices via the electromagnetic signals. RF circuitry 708 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 708 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 710, speaker 711, and microphone 713 provide an audio interface between a user and device 700. Audio circuitry 710 receives audio data from peripherals interface 718, converts the audio data to an electrical signal, and transmits the electrical signal to speaker 711. Speaker 711 converts the electrical signal to human-audible sound waves. Audio circuitry 710 also receives electrical signals converted by microphone 713 from sound waves. Audio circuitry 710 converts the electrical signal to audio data and transmits the audio data to peripherals interface 718 for processing. Audio data may be retrieved from and/or transmitted to memory 702 and/or RF circuitry 708 by peripherals interface 718. In some embodiments, audio circuitry 710 also includes a headset jack (e.g., 812, FIG. 8). The headset jack provides an interface between audio circuitry 710 and removable audio input/output peripherals, such as output-only headphones or a headset with both output (e.g., a headphone for one or both ears) and input (e.g., a microphone).

I/O subsystem 706 couples input/output peripherals on device 700, such as touch screen 712 and other input control devices 716, to peripherals interface 718. I/O subsystem 706 may include display controller 756 and one or more input controllers 760 for other input or control devices. The one or more input controllers 760 receive/send electrical signals from/to other input or control devices 716. The other input control devices 716 may include physical buttons (e.g., push buttons, rocker buttons, etc.), dials, slider switches, joysticks, click wheels, and so forth. In some alternate embodiments, input controller(s) 760 may be coupled to any (or none) of the following: a keyboard, infrared port, USB port, and a pointer device such as a mouse. The one or more buttons (e.g., 808, FIG. 8) may include an up/down button for volume control of speaker 711 and/or microphone 713. The one or more buttons may include a push button (e.g., 806, FIG. 8).

Touch-sensitive display 712 provides an input interface and an output interface between the device and a user. Display controller 756 receives and/or sends electrical signals from/to touch screen 712. Touch screen 712 displays visual output to the user. The visual output may include graphics, text, icons, video, and any combination thereof (collectively termed "graphics"). In some embodiments, some or all of the visual output may correspond to user-interface objects.

Touch screen 712 has a touch-sensitive surface, sensor or set of sensors that accepts input from the user based on haptic and/or tactile contact. Touch screen 712 and display controller 756 (along with any associated modules and/or sets of instructions in memory 702) detect contact (and any movement or breaking of the contact) on touch screen 712 and converts the detected contact into interaction with user-interface objects (e.g., one or more soft keys, icons, web pages or images) that are displayed on touch screen 712. In an example embodiment, a point of contact between touch screen 712 and the user corresponds to a finger of the user.

Touch screen 712 may use LCD (liquid crystal display) technology, LPD (light emitting polymer display) technology, or LED (light emitting diode) technology, although other display technologies may be used in other embodiments. Touch screen 712 and display controller 756 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 712. In an example embodiment, projected mutual capacitance sensing technology is used.

Touch screen 712 may have a video resolution in excess of 100 dpi. In some embodiments, the touch screen has a video resolution of approximately 160 dpi. The user may make contact with touch screen 712 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 700 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 712 or an extension of the touch-sensitive surface formed by the touch screen.

Device 700 also includes power system 762 for powering the various components. Power system 762 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 700 may also include one or more optical sensors or cameras 764. FIG. 7 shows an optical sensor 764 coupled to optical sensor controller 758 in I/O subsystem 706. Optical sensor 764 may include charge-coupled device (CCD) or complementary metal-oxide semiconductor (CMOS) phototransistors. Optical sensor 764 receives light from the environment, projected through one or more lens, and converts the light to data representing an image. In conjunction with imaging module 743 (also called a camera module), optical sensor 764 may capture still images or video. In some embodiments, an optical sensor 764 is located on the back of device 700, opposite touch screen display 712 on the front of the device, so that the touch screen display 712 may be used as a viewfinder for still and/or video image acquisition. In some embodiments, another optical sensor is located on the front of the device so that the user's image may be obtained for videoconferencing while the user views the other video conference participants on the touch screen display.

Device 700 may also include one or more proximity sensors 766. FIG. 7 shows proximity sensor 766 coupled to peripherals interface 718. Alternately, proximity sensor 766 may be coupled to input controller 760 in I/O subsystem 706. In some embodiments, the proximity sensor 766 turns off and disables touch screen 712 when the multifunction device 700 is placed near the user's ear (e.g., when the user is making a phone call).

Device 700 includes one or more orientation sensors 768. In some embodiments, the one or more orientation sensors 768 include one or more accelerometers (e.g., one or more linear accelerometers and/or one or more rotational accelerometers). In some embodiments, the one or more orientation sensors 768 include one or more gyroscopes. In some embodiments, the one or more orientation sensors 768 include one or more magnetometers. In some embodiments, the one or more orientation sensors 768 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 700. In some embodiments, the one or more orientation sensors 768 include any combination of orientation/rotation sensors. FIG. 7 shows the one or more orientation sensors 768 coupled to peripherals interface 718. Alternately, the one or more orientation sensors 768 may be coupled to an input controller 760 in I/O subsystem 706. In some embodiments, information is displayed on the touch screen display 712 in a portrait view or a landscape view based on an analysis of data received from the one or more orientation sensors 768.

In some embodiments, the software components stored in memory 702 include operating system 726, communication module (or set of instructions) 728, contact/motion module (or set of instructions) 730, graphics module (or set of instructions) 732, text input module (or set of instructions) 734, Global Positioning System (GPS) module (or set of instructions) 735, arbiter module 758 and applications (or sets of instructions) 736. Furthermore, in some embodiments memory 702 stores device/global internal state 757. Device/global internal state 757 includes one or more of: active application state, indicating which applications, if any, are currently active; display state, indicating what applications, views or other information occupy various regions of touch screen display 712; sensor state, including information obtained from the device's various sensors and input control devices 716; and location information concerning the device's location and/or attitude.

Operating system 726 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 728 facilitates communication with other devices over one or more external ports 724 and also includes various software components for handling data received by RF circuitry 708 and/or external port 724. External port 724 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 730 may detect contact with touch screen 712 (in conjunction with display controller 756) and other touch sensitive devices (e.g., a touchpad or physical click wheel). In some embodiments, contact/motion module 730 and display controller 756 detect contact on a touchpad. Contact/motion module 730 may detect a gesture input by a user. Different gestures on the touch-sensitive surface have different contact patterns. Graphics module 732 includes various known software components for rendering and displaying graphics on touch screen 712 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like. Text input module 734, which may be a component of graphics module 732, provides soft keyboards for entering text in various applications (e.g., contacts, e-mail, and any other application that needs text input). GPS module 735 determines the location of the device and provides this information for use in various applications 736 (e.g., to a camera application as picture/video metadata).

Applications 736 may include one or more modules (e.g., a contacts module, an email client module, a camera module for still and/or video images, etc.) Examples of other applications 736 that may be stored in memory 702 include other word processing applications, other image editing applications, drawing applications, presentation applications, JAVA-enabled applications, encryption, digital rights management, voice recognition, and voice replication. Each of the modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 702 may store a subset of the modules and data structures identified above. Furthermore, memory 702 may store additional modules and data structures not described above.

Figure 8:
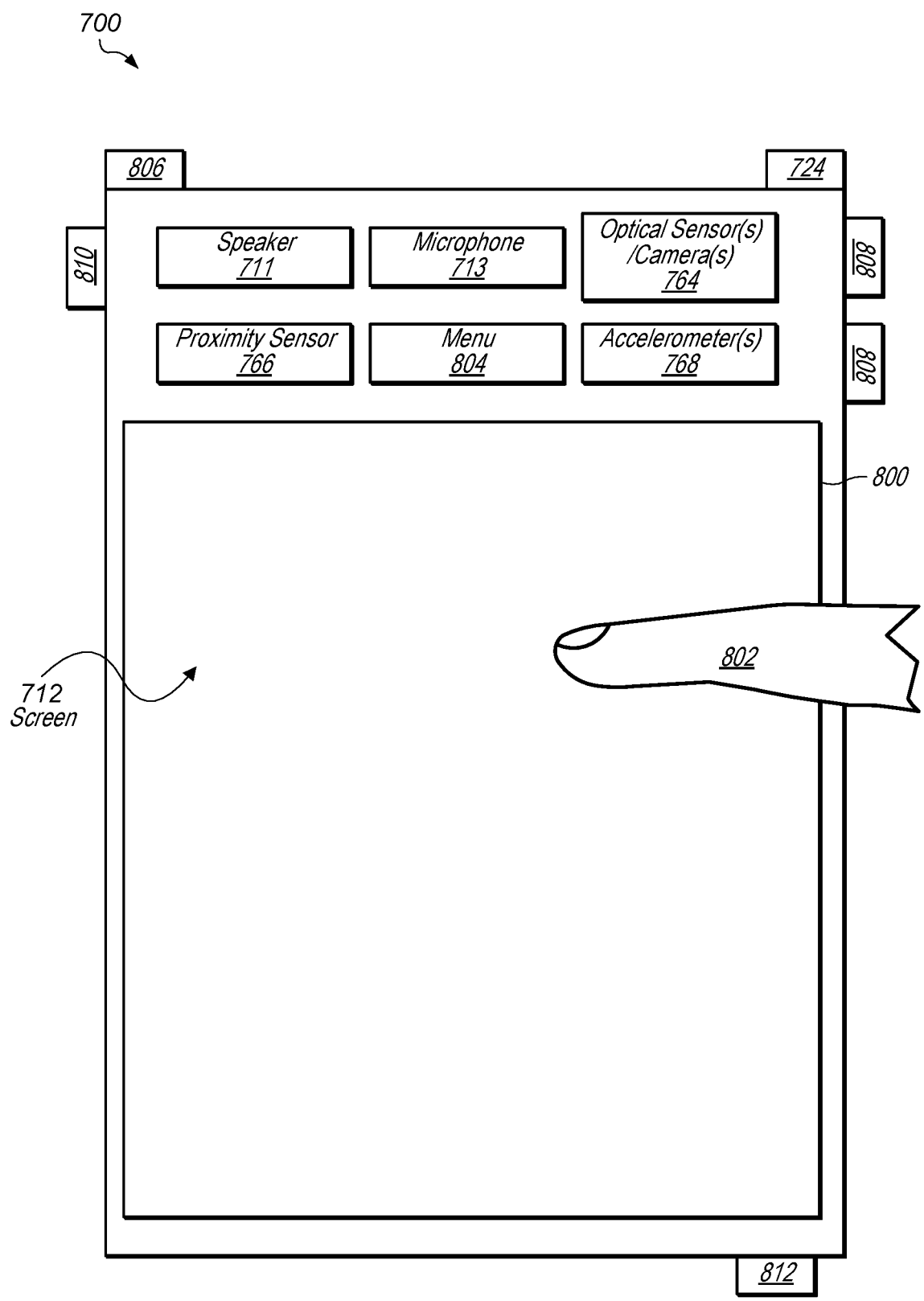
FIG. 8 depicts an example portable multifunction device that may include a camera having a folded optics arrangement, in accordance with some embodiments.

FIG. 8 depicts an example portable multifunction device 700 that may include a camera with a folded optics arrangement, in accordance with some embodiments. In some embodiments, the portable multifunction device 700 may include one or multiple features, components, and/or functionality of embodiments described herein with reference to FIGS. 1-7 and 9.

The device 700 may have a touch screen 712. The touch screen 712 may display one or more graphics within user interface (UI) 800. In this embodiment, as well as others described below, a user may select one or more of the graphics by making a gesture on the graphics, for example, with one or more fingers 802 (not drawn to scale in the figure) or one or more styluses 803 (not drawn to scale in the figure).

Device 700 may also include one or more physical buttons, such as "home" or menu button 804. As described previously, menu button 804 may be used to navigate to any application 736 in a set of applications that may be executed on device 700. Alternatively, in some embodiments, the menu button 804 is implemented as a soft key in a GUI displayed on touch screen 712.

In one embodiment, device 700 includes touch screen 712, menu button 804, push button 806 for powering the device on/off and locking the device, volume adjustment button(s) 808, Subscriber Identity Module (SIM) card slot 810, head set jack 812, and docking/charging external port 724. Push button 806 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 700 also may accept verbal input for activation or deactivation of some functions through microphone 713.

It should be noted that, although many of the examples herein are given with reference to optical sensor(s)/camera(s) 764 (on the front of a device), one or more rear-facing cameras or optical sensors that are pointed opposite from the display may be used instead of, or in addition to, an optical sensor(s)/camera(s) 764 on the front of a device.

Figure 9:
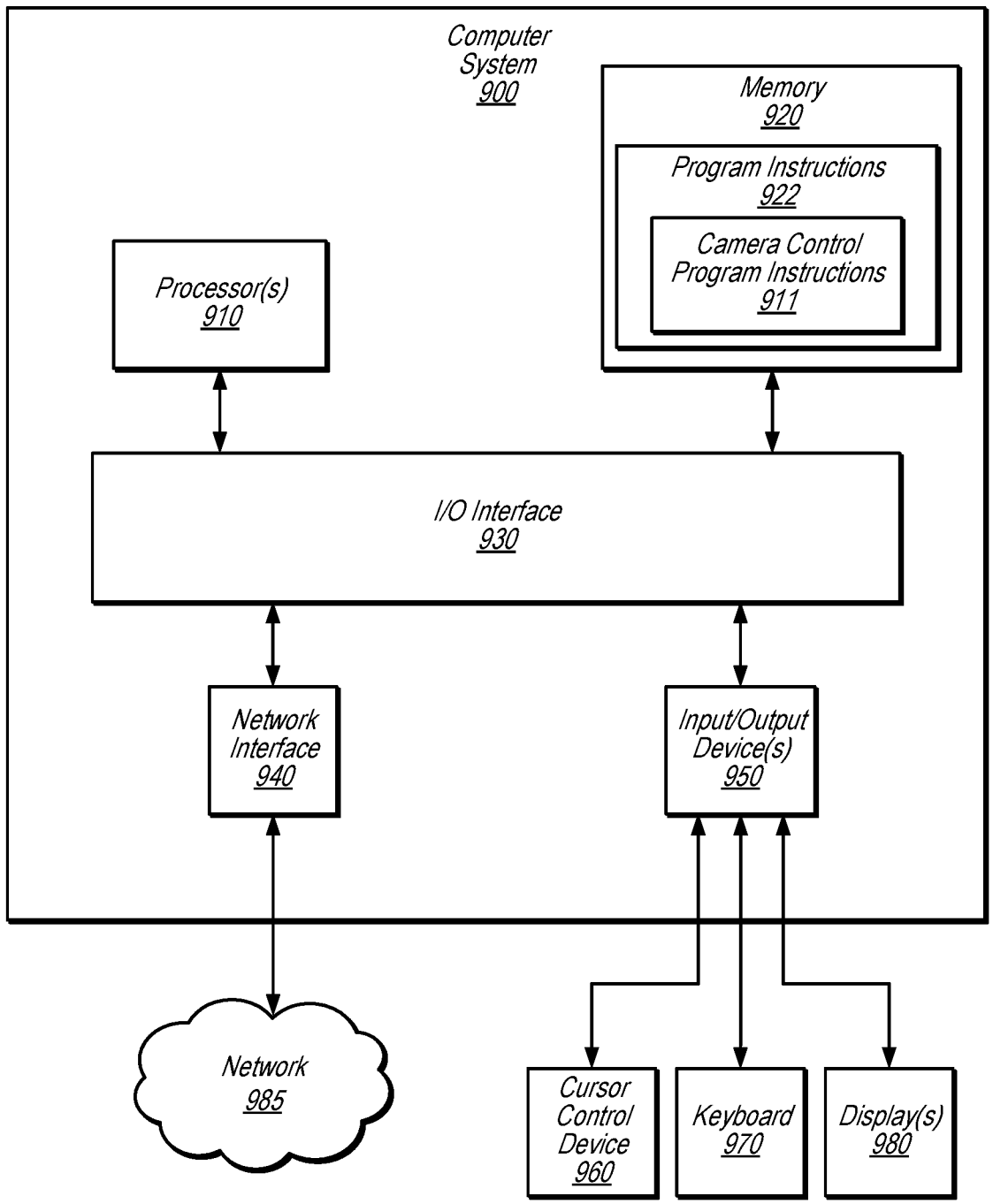
FIG. 9 illustrates an example computer system that may include a camera having a folded optics arrangement, in accordance with some embodiments.

FIG. 9 illustrates an example computer system 900 that may include a camera with a folded optics arrangement, in accordance with some embodiments. In some embodiments, the computer system 900 may include one or multiple features, components, and/or functionality of embodiments described herein with reference to FIGS. 1-8.

The computer system 900 may be configured to execute any or all of the embodiments described above. In different embodiments, computer system 900 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 900, which may interact with various other devices. Note that any component, action, or functionality described above with respect to FIGS. 1-14 may be implemented on one or more computers configured as computer system 900 of FIG. 9, according to various embodiments. In the illustrated embodiment, computer system 900 includes one or more processors 910 coupled to a system memory 920 via an input/output (I/O) interface 930. Computer system 900 further includes a network interface 940 coupled to I/O interface 930, and one or more input/output devices 950, such as cursor control device 960, keyboard 970, and display(s) 980. In some cases, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store camera control program instructions 922 and/or camera control data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions 922 may be configured to implement a lens control application 924 incorporating any of the functionality described above. Additionally, existing camera control data 932 of memory 920 may include any of the information or data structures described above. In some embodiments, program instructions and/or data may be received, sent or stored upon different types of computer-accessible media or on similar media separate from system memory 920 or computer system 900. While computer system 900 is described as implementing the functionality of functional blocks of previous Figures, any of the functionality described herein may be implemented via such a computer system.

In one embodiment, I/O interface 930 may be configured to coordinate I/O traffic between processor 910, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 985 (e.g., carrier or agent devices) or between nodes of computer system 900. Network 985 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 950 may, in some embodiments, include one or more display terminals, keyboards, keypads, touchpads, scanning devices, voice or optical recognition devices, or any other devices suitable for entering or accessing data by one or more computer systems 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 922, which may be processor-executable to implement any element or action described above. In one embodiment, the program instructions may implement the methods described above. In other embodiments, different elements and data may be included. Note that data may include any data or information described above.

Those skilled in the art will appreciate that computer system 900 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A camera, comprising:
    a folded optics arrangement configured to fold a path of light, the folded optics arrangement comprising:
        a first prism;
        a second prism; and
        a lens group disposed between the first prism and the second prism, wherein the lens group includes one or more lens elements;
    an image sensor to capture light that has passed through the first prism, the lens group, and the second prism; and
    an actuator module configured to tilt the first prism relative to the lens group and relative to the image sensor.

2. The camera of claim 1, wherein the actuator module comprises one or more voice coil motor (VCM) actuators.

3. The camera of claim 1, wherein the actuator module is further configured to move the lens group relative to the image sensor.

4. The camera of claim 3, wherein the actuator module comprises:
    a first optical image stabilization (OIS) VCM actuator to tilt the first prism relative to the image sensor to provide OIS movement of an image, captured via the image sensor, in a first direction;
    a second OIS VCM actuator to translate the lens group relative to the image sensor to provide OIS movement of the image in a second direction that is orthogonal to the first direction; and
    an autofocus (AF) VCM actuator to translate the lens group relative to the image sensor to provide AF movement of the lens group in a third direction that is orthogonal to the second direction.

5. The camera of claim 4, wherein, to tilt the first prism relative to the image sensor, the first OIS VCM actuator is configured to rotate the first prism about an axis that is parallel to the second direction.

6. The camera of claim 4, wherein:
    the second OIS VCM actuator comprises:
        OIS magnets, comprising:
            a first OIS magnet; and
            a second OIS magnet opposite the first magnet with respect to the lens group; and
        OIS coils, comprising:
            a first OIS coil proximate the first magnet; and
            a second OIS coil proximate the second magnet and opposite the first OIS coil with respect to the lens group; and
    the AF VCM actuator comprises:
        an AF magnet; and
        an AF coil;
        wherein the AF magnet and the AF coil are located proximate one another and below the lens group.

7. A system, comprising:
    a camera, comprising:
        a folded optics arrangement configured to fold a path of light, the folded optics arrangement comprising:
            a first prism;
            a second prism; and
            a lens group disposed between the first prism and the second prism, wherein the lens group includes one or more lens elements;
        an image sensor to capture light that has passed through the first prism, the lens group, and the second prism;
        an actuator module configured to translate the lens group, relative to the first prism and the second prism and relative to the image sensor, along two axes; and a suspension arrangement to suspend the lens group and allow movement of the lens group along the two axes.

8. The system of claim 7, wherein the suspension arrangement comprises:
a spring attached to at least one of a lens barrel that holds the lens group or a lens carrier that is coupled to the lens group;
one or more wires, wherein a wire of the one or more wires comprises:
a top end portion attached to the spring; and
a bottom end portion attached to a fixed structure of the camera.

9. The system of claim 8, wherein the suspension arrangement further comprises a viscoelastic material that surrounds at least a portion of the wire to dampen movement of the wire.

10. The system of claim 8, wherein the wire extends, from the top end portion to the bottom end portion, in a direction that is orthogonal to an optical axis defined by the lens group.

11. The system of claim 7, wherein:
the suspension arrangement comprises a flexure formed from a sheet; and
the flexure comprises:
a top end portion attached to at least one of a lens barrel that holds the lens group or a lens carrier that is coupled to the lens group; and
a bottom end portion attached to a fixed structure of the camera.

12. The system of claim 11, wherein the suspension arrangement further comprises a viscoelastic material that surrounds at least a portion of the flexure to dampen movement of the flexure.

13. The system of claim 12, wherein the flexure extends, from the top end portion to the bottom end portion, in a direction that is orthogonal to an optical axis defined by the lens group.

14. A device, comprising:
a folded optics arrangement configured to fold a path of light, the folded optics arrangement comprising:
a prism module; and
a lens group comprising one or more lens elements; and
an image sensor to capture light that has passed through the prism module and the lens group;
wherein the prism module comprises:
a prism;
a prism carrier;
a base;
an actuator configured to tilt the prism relative to the lens group and relative to the image sensor; and
a flexure arrangement comprising one or more flexures that engage the prism carrier and the base.

15. The device of claim 14, wherein:
the prism is a first prism of the folded optics arrangement;
the folded optics arrangement further comprises a second prism;
the lens group is located between the first prism and the second prism; and
the image sensor captures light that has passed through the first prism, the lens group, and the second prism.

16. The device of claim 14, wherein:
the actuator is a voice coil motor (VCM) actuator; and
the VCM actuator tilts the prism relative to the image sensor to provide optical image stabilization (OIS) movement of an image, on the image sensor, in at least one direction.

17. The device of claim 16, wherein:
the VCM actuator comprises:
a magnet attached to the prism carrier; and
a coil attached to the base; and
the VCM actuator tilts the prism, together with the prism carrier, relative to the base.

18. The device of claim 16, wherein:
the VCM actuator comprises:
a coil attached to the prism carrier; and
a magnet attached to the base; and
the VCM actuator tilts the prism, together with the prism carrier, relative to the base.

19. The device of claim 14, wherein the flexure arrangement comprises:
a first flexure that has a longest dimension in a first direction; and
a second flexure that has a longest dimension in a second direction that is orthogonal to the first direction.

20. The device of claim 19, wherein:
the first flexure defines a vertically oriented plane;
the second flexure defines a horizontally oriented plane; and
an intersection between the vertically oriented plane and the horizontally oriented plane defines an axis about which the prism is tilted when actuated via the actuator.

* * * * *